J. LIVINGSTON.
WHEY AND MILK MEASURING APPARATUS.
APPLICATION FILED JUNE 6, 1908.
931,071.
Patented Aug. 17, 1909.
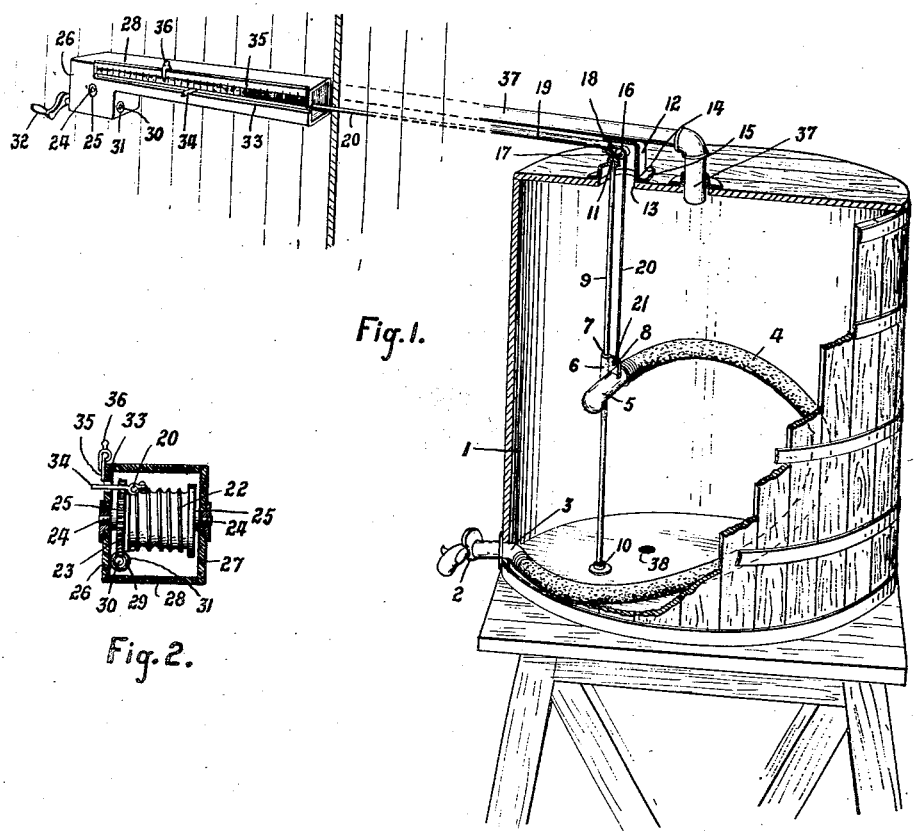
Fig. 1.
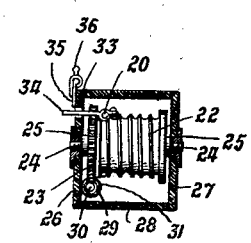
Fig. 2.
Fig. 3.
Fig. 5.
Fig. 4.
Witnesses.
Lloyd Blackmore
R. Pigeon
Inventor.
John Livingston
by
E. J. Fetherstonhaugh Atty.

UNITED STATES PATENT OFFICE.

JOHN LIVINGSTON, OF OTTAWA, ONTARIO, CANADA, ASSIGNOR OF ONE-HALF TO DANIEL CHRISTIE HERON, OF OTTAWA, ONTARIO, CANADA.

WHEY AND MILK MEASURING APPARATUS.

No. 931,071.  Specification of Letters Patent.  Patented Aug. 17, 1909.

Application filed June 6, 1908. Serial No. 437,182.

*To all whom it may concern:*

Be it known that I, JOHN LIVINGSTON, a subject of the King of Great Britain, residing at the city of Ottawa, in the Province of Ontario, in the Dominion of Canada, have invented certain new and useful Improvements in Whey and Milk Measuring Apparatus, of which the following is a specification.

The invention relates to improvements in whey measuring apparatus as described in the present specification and illustrated in the accompanying drawings, that form part of the same.

The invention consists essentially in the novel arrangement and construction of parts, whereby a predetermined quantity of whey to be drawn off from a tank, is measured from a distance by suitable means connected with an intake nozzle slidably arranged on a vertical guide-rod and connected to a flexible pipe through which the measured quantity of whey flows.

The objects of the invention are to devise a simple and inexpensive measuring apparatus of few parts and readily applied to a whey tank, whereby the manager or operator of a cheese factory may measure the quantity of whey to be delivered from a tank when situated at a distance, and also to provide an apparatus which will be certain in operation and cannot be interfered with by the person receiving the measure of whey.

In the drawings, Figure 1 is a perspective view partly broken away of the measuring apparatus applied to a whey tank. Fig. 2 is an enlarged cross-sectional view through the box containing the mechanism for lowering and raising the intake nozzle. Fig. 3 is an enlarged sectional perspective view of the dome into which the upper end of the guide-rod fits. Fig. 4 is an enlarged longitudinal sectional view of the intake nozzle. Fig. 5 is an enlarged perspective view partly broken away showing a modified form of raising and lowering mechanism.

Like numerals of reference indicate corresponding parts in each figure.

Referring to the drawings, 1 is a whey tank here shown as formed of wooden staves and supported on a suitable frame-work at a convenient height for a person in a vehicle to draw whey therefrom through the tap 2.

2 is a tap of an ordinary type extending through the side wall of the tank toward the bottom thereof.

3 is an elbow fitting on to the end of the tap 2, which extends into the interior of the tank.

4 is a flexible pipe of rubber hose suitably reinforced to insure a clear passage therethrough for the flow of the whey. The pipe is connected at one end to the elbow 3, and is of sufficient length to curl in a spiral form around the vat to the metal intake nozzle 5. The metal intake nozzle 5 has the inner end thereof inserted in the end of the pipe 4 and the outer end elbowed so that the open intake faces downwardly.

6 is a vertically arranged bearing-piece having the vertical hole 7 therethrough and the web 8 extending laterally therefrom. The bearing-piece 6 and the web 8 preferably form part of the nozzle 5 toward the inner end thereof.

9 is a guide-rod having the lower end thereof firmly secured in the foot 10, the said foot being screwed to the bottom of the tank preferably in radial alinement with the tap 2 and near the center of said tank. The rod 9 extends upwardly through the hole 7, and terminates in the orifice 11 in the interior of the dome 12 to one side thereof. The mouth of the intake nozzle 5 is thus held perfectly horizontal in the tank. The dome 12 caps the hole 13 through the cover of the tank, and is firmly secured thereto by the screws 14 inserted through orifices in the outwardly extending base flange 15. It will thus be seen that the nozzle 5 may be slid upwardly on the rod 9 until said nozzle is against the cover of the tank, the dome 12 allowing the necessary length of rod for the bearing-piece 6. Furthermore the weight of the outer end of said nozzle counter-balances the weight of the pipe 4 on the inner end thereof and thus prevents the binding of the nozzle on the guide-rod.

16 is a grooved pulley journaled on the cross-pin 17 extending from side to side of the dome 12.

18 is a threaded orifice in the side of the dome 12 and leading to the recessed top 18 thereof in alinement with the upper side of the grooved pulley 16 and into which is screwed the correspondingly threaded end of the pipe 19 leading from the cheese factory.

20 is a cord or fine cable secured at the end thereof through the orifice 21 in the web 8 of the nozzle and extending upwardly over the grooved pulley 16 and through the pipe 19.

It will now be readily understood that the nozzle 5 may be lowered on the guide-rod 9 to any depth in the tank 1, and if the tank 1 be filled with whey it may be drawn off from said tank by opening the tap 2 thereby allowing the whey to flow into the nozzle 5, flexible pipe 4 and out of the tap 2 until the surface of the whey in the tank is lowered to the mouth of the nozzle, when the whey will cease to flow until the nozzle is lowered farther into the tank by the cord 20.

In order that the manager or operator of the cheese factory may lower the nozzle in the tank to measure a predetermined quantity of whey to be drawn off by a customer, the cord 20 extends through the said pipe 19 into the cheese factory and is secured at the end thereof to a spirally grooved winding drum 22. The drum 22 has the worm-wheel 23 secured to one end thereof and the axial studs 24 projecting therefrom and journaled in bearings 25 in the front and back boards 26 and 27 of the box 28 where it is enlarged at one end thereof to accommodate the said winding drum.

29 is a worm formed on the shaft 30, journaled in the bearings 31 in the enlarged end of the box, the worm 29 meshing with the teeth of the worm-wheel 23.

32 is a crank-handle secured to the end of the shaft 30 for turning the same, thereby rotating the winding drum, and winding in or letting out the cord 20. The box 28 incases the cord 20 for a portion of its length where it extends inside the cheese factory and has the slot 33 in the front board 26 extending longitudinally thereof in parallel alinement with the cord 20.

34 is an indicator-finger clamped at the inner end thereof to the cord 20 and having the outer end thereof projecting through the slot 33, the said finger traveling along the said slot as the cord is wound or unwound on the drum 22.

35 is a scale-board secured to the front-board 26 of the box 28 immediately above the slot 33, the said scale-board having suitable graduations thereon indicating units of quantity or weight of whey contained in units of depth in the tank 1.

36 is a pointer slidably arranged on the upper edge of the scale-board 35 to record the last point thereon from which the indicator-finger has been moved.

37 is a feed pipe leading from the cheese factory to the top of the whey tank and through which the whey is pumped to fill the tank.

38 is a plug in the bottom of the tank which may be removed for flushing purposes.

In the operation of the apparatus the operator of the cheese factory turns the handle 32 attached to the worm-shaft 30 and thereby rotates the drum 22 until the cord is wound thereon sufficiently to raise the mouth of the intake nozzle to the top of the tank, the bearing-piece 6, as before stated, sliding upwardly on the rod 9 into the dome 12. Whey is now pumped or forced through the feed pipe 37 until the tank 1 is filled to the top. It is found that a tank used by factories of ordinary capacity only requires filling once every morning to deliver whey required by customers for one day. The indicating finger 34 is clamped to the cord 20 so that it is at the beginning of the scale-board 35 when the said cord is wound on to the drum 22 sufficiently to raise the intake nozzle 5 to the top of the tank. The pointer 36 is also placed at the beginning of the scale-board when the tank 1 is filled. When the factory operator wishes to measure out a quantity of whey to be drawn off from the tank 1 by a customer he turns the crank-handle 32 to unwind the cord 20 on the drum 22 until the indicating finger 34 shows the required quantity of whey to be delivered, the nozzle 5 being simultaneously lowered in the tank 1 by the unwinding of the cord 20 to the proper depth so that the whey above the intake nozzle which will flow therethrough is the same quantity as indicated on the scale-board. The customer may now draw off his measure of whey by opening the tap 2, and the whey will flow from the tank until the surface level reaches the level of the intake nozzle 5. Any further flow of whey is now impossible until another measure is given by the factory operator again turning the crank-handle 32, as the cord which lowers the intake nozzle is incased by the pipe 19 and consequently cannot be cut or tampered with. Before the intake nozzle is lowered further into the whey to give another measure, it is desirable to slide the pointer 36 along the scale-board to the indicating finger, when the cord may be further unwound by the crank-handle 32, and the indicator finger will move along the slot showing the measure of whey which will be delivered from the tank, the pointer recording meanwhile the last position of the indicator finger. The quantity of whey delivered at any one time is thereby indicated on the scale between the pointer and the indicator-finger.

In Fig. 5 a modified form of the raising and lowering mechanism is shown, in which the drum 22 and gear 23 are rotatably mounted on a stud 39 secured to the back board 40. 41 is an indicating finger rotatably mounted on the outer end of the stud 39 and adapted to move over the ratchet teeth 42 retaining the finger 41 in any position it may be set.

In operation the finger 41 is moved over the ratchet teeth 42 to the right until it points to the desired point on an indicating scale arranged on the back board 40 indicating the amount of whey to be delivered from the tank. The worm 29 is now turned until the gear 23 is rotated to the left and the finger 41 brought back to the zero mark on the indicating scale thereby letting out the cord 20 far enough to drop the nozzle 5 in the tank the required depth to deliver the proper quantity of whey. A recording scale may be arranged on the gear which will indicate the distance the gear has been rotated, and accordingly the amount of whey measured in small quantities by the indicating finger. It must also be understood that other liquids may be readily measured from a tank by means of the apparatus herein shown and described, and that without departing from the spirit of my invention the nozzle 5 may, if desired, by turned upwardly.

What I claim as my invention is:

1. In a device of the class described, the combination with a tank, of a vertical guide-rod secured in the interior thereof, an intake nozzle having a bearing-piece slidably arranged on said guide-rod, a tap in the side wall of said tank toward the bottom thereof, a flexible pipe connecting said intake nozzle with said tap, a pulley journaled at the top of said tank, a winding drum suitably journaled at a distance from said tank, a cord attached at one end to said intake nozzle and passing over said pulley and attached at the other end to said winding drum.

2. In a device of the class described, the combination with a tank, of a vertical guide-rod secured in the interior thereof, an intake nozzle having a bearing-piece slidably arranged on said guide-rod, a tap in the side wall of said tank toward the bottom thereof, a flexible pipe connecting said intake nozzle with said tap, a pulley journaled at the top of said tank, a winding drum suitably journaled at a distance from said tank, a cord attached at one end to said intake nozzle and passing over said pulley and attached at the other end to said winding drum, a gear secured to said winding drum, a worm meshing with said gear and having a handle attached thereto, a scale board arranged in proximity to said cord, an indicating finger attached to said cord and traveling along said scale board, and a recording finger slidably arranged on said scale board.

3. In a device of the class described, the combination with a tank, of an opening in the cover of said tank, a dome capping said opening, a foot secured on the bottom of said tank in vertical alinement with said dome, a guide-rod extending between and secured to said dome and said foot, an intake nozzle having a bearing-piece slidably arranged on said guide-rod and the mouth thereof facing downwardly, a tap located at the bottom of said tank, a flexible pipe connecting said intake nozzle with said tap, a pin extending across the interior of said dome, a pulley journaled on said pin, a winding drum suitably journaled at a distance from said tank, a cord attached at one end to said intake nozzle and passing over said pulley and attached at the other end to said winding drum, a scale-board in proximity to said cord, and an indicating finger attached to said cord and traveling along said scale-board to indicate the position of said intake nozzle in said tank.

Signed at the city of Ottawa, in the Province of Ontario, in the Dominion of Canada, this 16th day of April 1908.

JOHN LIVINGSTON.

Witnesses:
LLOYD BLACKMORE,
W. T. CUFFE QUESI.